(12) United States Patent
Besarati et al.

(10) Patent No.: US 11,766,636 B1
(45) Date of Patent: Sep. 26, 2023

(54) MODULAR OPEN SYSTEMS ARCHITECTURE DIRECT AIR CAPTURE PLATFORM

(71) Applicant: CARBON CAPTURE INC., Los Angeles, CA (US)

(72) Inventors: Saeb Besarati, Los Angeles, CA (US); Eric Colbert, Los Angeles, CA (US); Brian Holman, Los Angeles, CA (US); Jonas Lee, Los Angeles, CA (US); Noah Liebman, Los Angeles, CA (US)

(73) Assignee: CARBON CAPTURE, INC., Los Angeles, CA (US)

( * ) Notice: Subject to any disclaimer, the term of this patent is extended or adjusted under 35 U.S.C. 154(b) by 0 days.

(21) Appl. No.: 18/326,863

(22) Filed: May 31, 2023

Related U.S. Application Data (60) Provisional application No. 63/378,764, filed on Oct. 7, 2022, provisional application No. 63/347,342, filed on May 31, 2022.

(51) Int. Cl.
*B01D 53/04* (2006.01)
*B01D 53/62* (2006.01)

(52) U.S. Cl.
CPC ......... *B01D 53/62* (2013.01); *B01D 53/0407* (2013.01); *B01D 2257/504* (2013.01); *B01D 2258/06* (2013.01)

(58) Field of Classification Search
CPC ............................ B01D 53/04; B01D 53/0407; B01D 53/0462; B01D 53/0476; B01D 53/62; B01D 2257/504; B01D 2258/06
USPC ........ 95/95, 96, 102, 139; 96/121, 126–128, 96/145, 147, 148, 154
See application file for complete search history.

(56) References Cited

U.S. PATENT DOCUMENTS

| | | | |
|---|---|---|---|
| 11,389,761 B1* | 7/2022 | Stark, Jr. ............ | B01D 53/0476 |
| 2011/0146487 A1* | 6/2011 | Celik ................. | B01D 53/0407 96/121 |
| 2023/0008877 A1* | 1/2023 | Ding ................... | B01J 20/3071 |
| 2023/0070112 A1* | 3/2023 | Besarati ............ | B01D 53/0476 |
| 2023/0211278 A1* | 7/2023 | Eisenberger ....... | B01D 53/0431 95/139 |

* cited by examiner

*Primary Examiner* — Frank M Lawrence, Jr.
(74) *Attorney, Agent, or Firm* — RAPHAEL BELLUM PLLC (57) ABSTRACT

Systems and methods for modular and adaptable carbon dioxide ($CO_2$) capture, separation, and storage in a variety of disparate site locations are provided. The systems and methods include utilizing a plurality of transportable, mass-producible, and stackable $CO_2$ capture modules locally arranged in a cluster serviced by modular or locally fixed utilities modules that are in turn serviced by centralized plant services facilities, which may be dedicated to the $CO_2$ capture system or may alternatively be shared with other co-located operations. The $CO_2$ capture modules comprise a plurality of sorbent reactors, each comprising removable sorbent cartridges which may be easily exchanged for maintenance or upgrade purposes. The $CO_2$ sorbent reactors are alternatively operated in adsorption and desorption modes and synchronized with each other within the sorbent module and the corresponding cluster to achieve continuous operation.

20 Claims, 9 Drawing Sheets

MODULAR OPEN SYSTEMS ARCHITECTURE DIRECT AIR CAPTURE PLATFORM

CROSS-REFERENCE TO RELATED APPLICATIONS

This application claims benefit of priority from U.S. Provisional Application No. 63/347,342 filed on May 31, 2022, and from U.S. Provisional Application No. 63/378,764 filed on Oct. 7, 2022, the entire contents of which are incorporated by reference.

TECHNICAL FIELD

The technology relates to manufacturable, scalable, and easily upgradable modular systems and methods for direct capture and separation of carbon dioxide from the atmosphere.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas, and its concentration in the atmosphere has sharply increased over the past century due to the burning of fossil fuels. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. These processes are commonly referred to as carbon capture processes and carbon capture directly from ambient air is known as direct air capture (DAC).

Carbon capture processes commonly utilize some type of regenerable sorbent material to capture $CO_2$ from a source gas stream and then subsequently release the adsorbed $CO_2$ under controlled conditions so that it can be captured and stored. Large-scale gas-liquid processes utilizing caustic solutions or liquid amine materials to capture $CO_2$ from high-concentration point-sources such as flue gas have been developed but require high capital expenditures and long lead times to construct, have high energy requirements, and are much less efficient at the relatively low concentrations of $CO_2$ present in ambient air. Furthermore, liquid sorbent materials are commonly toxic, corrosive, and/or otherwise hazardous in use, so extreme and expensive precautions must be utilized. Therefore, DAC processes more commonly utilize some type of regenerable solid sorbent material to capture the $CO_2$ from a gas or air stream (see, for example, Shi, et al., Angewandte Chemie International Edition, 2019, 59, 6984 (http://dx.doi.org/10.1002/anie.201906756), which is incorporated by reference in this disclosure in its entirety).

Solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins. In some cases, the solid $CO_2$ sorbents are utilized in powder or pellet form in fluidized bed or packed bed configurations. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed. However, limitations in the size and mechanical properties of high-capacity structured sorbents that can be fabricated create significant challenges for scaling such methods to a sufficient scale for practical DAC. Considerable research efforts are ongoing to develop new, higher performing solid $CO_2$ DAC sorbents and structured versions thereof and are expected to lead to significant advances in the coming years.

A DAC process typically involves a first step of moving ambient air through a bed of a solid sorbent that is effective at selectively capturing a significant portion of the $CO_2$ included therein. Due to the low concentrations (currently a little over 400 parts per million) of $CO_2$ in ambient air, high volumes of ambient air need to be moved and processed in a DAC process. Once the sorbent reaches a level of significant saturation of $CO_2$, it needs to be regenerated in a second step. During regeneration, the adsorbent bed is treated with, for example, heat, vacuum, moisture, steam, or some combination thereof to cause the $CO_2$ to desorb from the sorbent. The released $CO_2$ is subsequently captured, and the regenerated sorbent can then be returned to the first step and reused to capture more $CO_2$. Significant energy is required to circulate the high volume of air and to regenerate the sorbent, so the systems need to be highly efficient.

In theory, DAC units can be placed anywhere in the world because they process ambient air. However, DAC sites also require access to abundant, inexpensive energy and available land space and should be located close to injection or downstream use sites. Furthermore, various climate conditions at any particular locale can create difficulties or advantages for any specific DAC process. To quickly and effectively meet the needs for carbon elimination from the atmosphere over the coming decades, it is necessary to immediately implement DAC systems that are readily manufactured, flexibly and efficiently sited, adaptable to local and changing climate conditions, and easily upgradeable with new and improved sorbent technologies as they become available.

SUMMARY

Systems and methods in accordance with the invention for modular and adaptable carbon dioxide ($CO_2$) capture, separation, and storage in a variety of disparate site locations are provided. The systems and methods in accordance with the invention include a plurality of transportable, mass-producible, and stackable $CO_2$ capture modules locally arranged in a cluster serviced by locally fixed or modular utilities modules. The utilities modules are, in turn, serviced by centralized plant services facilities, which can be dedicated to the $CO_2$ capture system or can alternatively be shared with other co-located operations. The $CO_2$ capture modules include a plurality of sorbent reactors, each of which include removable, modular sorbent structures or containers that can be easily exchanged for maintenance or upgrade purposes or can be varied between different capture modules to optimize performance or to provide alternate functionality, such as atmospheric water harvesting. The sorbent reactors are alternatively operated in adsorption and desorption modes and are synchronized with each other within the sorbent module and the corresponding cluster to achieve continuous steady-state operation and to balance power, heat, and other utility loads within the array.

In some example embodiments of the invention, modular open architecture Direct Air Capture (DAC) systems include multiple levels of modularity for removing carbon dioxide ($CO_2$) from the atmosphere. In some example embodiments, the systems include a plant services unit for providing power distribution, water treatment, steam, and/or control signals. In some example embodiments, the systems include two or more utilities modules connected to the plant services unit that receive the power distribution, water treatment, steam, and/or control signals. In some example embodiments, the systems include two or more DAC capture modules connected to respective utilities modules, where each DAC capture module includes two or more sorbent reactors, and each sorbent reactor includes two or more removeable sorbent modules.

In some example embodiments, the removable sorbent modules can include one or more structured sorbents, each comprising a sorbent material capable of selectively adsorbing $CO_2$ from the atmosphere and fabricated into a structured form; and one or more support structures containing and constraining one or more of the structured sorbents such that an air stream may readily flow through the cartridge in at least one direction.

In some example embodiments, the plant services units can include a renewable power generation source, and in some example embodiments, the plant services units can provide $CO_2$ conditioning and sequestration.

In some example embodiments, the utilities module can also include vacuum pumps, condensers, heat exchangers, and/or heat recovery equipment for serving two or more DAC capture modules. In some example embodiments, the utilities module can provide service to about 8 to 20 DAC capture modules. In some example embodiments, the utilities modules and the DAC capture modules are each independently configured in size and design corresponding to a standard shipping container for effective transportation. For example, in some embodiments, the standard shipping container is selected from the group consisting of shipping containers approximately 20 feet long and 8 feet wide, approximately 40 feet long and 8 feet wide, and approximately 53 feet long and 8 feet wide.

In some example embodiments, the two or more DAC capture modules each include between 4-16 sorbent reactors, inclusively. In some example embodiments, the removeable sorbent modules include different sorbents that are interchangeable.

In some example embodiments of the invention, methods to remove carbon dioxide ($CO_2$) from the atmosphere using a modular open architecture Direct Air Capture (DAC) system include adsorbing $CO_2$ from ambient air by pulling or pushing a flow of ambient air through a sorbent with one or more fans, where the sorbent is housed within one or more sorbent modules, and where the one or more sorbent modules are modular sorbent support structures housed within a sorbent reactor, and where two or more sorbent reactors are housed within a capture module; and two or more capture modules are connected to a utilities module to form a cluster. In some example embodiments, the methods include stopping the flow of ambient air through the sorbent by sealing the sorbent reactor to the flow of ambient air, applying a vacuum to the sealed sorbent reactor to remove residual ambient air, and repressurizing the sorbent reactor by opening a steam inlet on the sorbent reactor to a flow of steam from the utilities module. In some example embodiments, the methods include desorbing $CO_2$ from the sorbent by opening a steam outlet on the sorbent reactor to allow the flow of steam to flow through and heat the sorbent and cause $CO_2$ to be desorbed and carried with the flow of steam through the steam outlet back to the utilities module. In some example embodiments, the methods include passing the flow of steam containing desorbed $CO_2$ through a condenser in the utilities module to condense liquid water and pass gaseous $CO_2$ to a plant services unit to be collected, cooling the sorbent by evaporative cooling by stopping the flow of steam through the sorbent reactor by closing the steam inlet and steam outlet and applying a vacuum to the sorbent reactor to evaporate residual moisture and remove residual $CO_2$ to create a moist $CO_2$ stream, and passing the moist $CO_2$ steam through a condenser in the utilities module to condense liquid water and pass gaseous $CO_2$ to the plant services unit to be collected. In some example embodiments, the adsorption is then restarted.

In some example embodiments, two or more clusters form an array of modular Direct Air Capture (DAC) units that are collectively serviced by the plant services unit. In some example embodiments, a subset of the two or more sorbent reactors within the array are undergoing adsorption while a different subset of the two or more sorbent reactors within the array are undergoing desorption.

In some example embodiments, the sorbent is a structured sorbent material for allowing a high flow of air through the sorbent modules with a low pressure drop. In some example embodiments, the structured sorbent material includes two or more sheets or plates supported within the sorbent modules in parallel. In some example embodiments, the parallel sheets or plates include sorbents coated onto, impregnated in, or held within porous polymeric supports, woven glass, carbon, ceramic or polymeric fiber fabrics or membranes, or glass, carbon, ceramic, or polymeric fiber felts. In some example embodiments, the structured sorbent material is in the form of a monolith material with the sorbent coated onto, incorporated into, or forming the walls of the monolith material. In some example embodiments, the structured sorbent material is in the form of at least one of the group of a honeycomb material with the sorbent coated onto, incorporated into, or forming the walls of the supporting honeycomb material, in the form of an open-cell foam, or in the form of a reticulated sheet or structure through which air may flow.

In some example embodiments, the sorbent is a powder, bead, or other particulate form included within a tubular, disc, sheet, or pleated sheet shaped structure through which air may pass.

In some example embodiments, two or more arrays are arranged and coordinated to collectively remove carbon dioxide ($CO_2$) from the atmosphere in a train configuration.

BRIEF DESCRIPTION OF THE DRAWINGS

These and other objects, features, and advantages of the invention will be more fully appreciated or become better understood when considered in conjunction with the accompanying drawings, where.

DETAILED DESCRIPTION

The systems of the present invention are based on a modular open systems architecture (MOSA). Modularity enables mass production, rapid development cycles, quick initial deployments, incremental roll-out of capacity, and unlimited scalability. Open architecture enables plug-and-play sorbent cartridges which, in turn, allows harnessing of emerging innovations in capacity, lifetime, and energy requirements across multiple sorbent families (e.g., amines, MOFs (metal-organic frameworks), and hybrid solutions) and allowing for continuous improvement as sorbent technology evolves. It also enables mixing and matching of optimal sorbents for a given climate or season. The MOSA approach utilizes multiple layers of modularity and enables a high degree of flexibility and upgradeability, thereby providing multiple paths to rapid cost reductions as sorbent, equipment, and process technologies advance.

Figure 1:
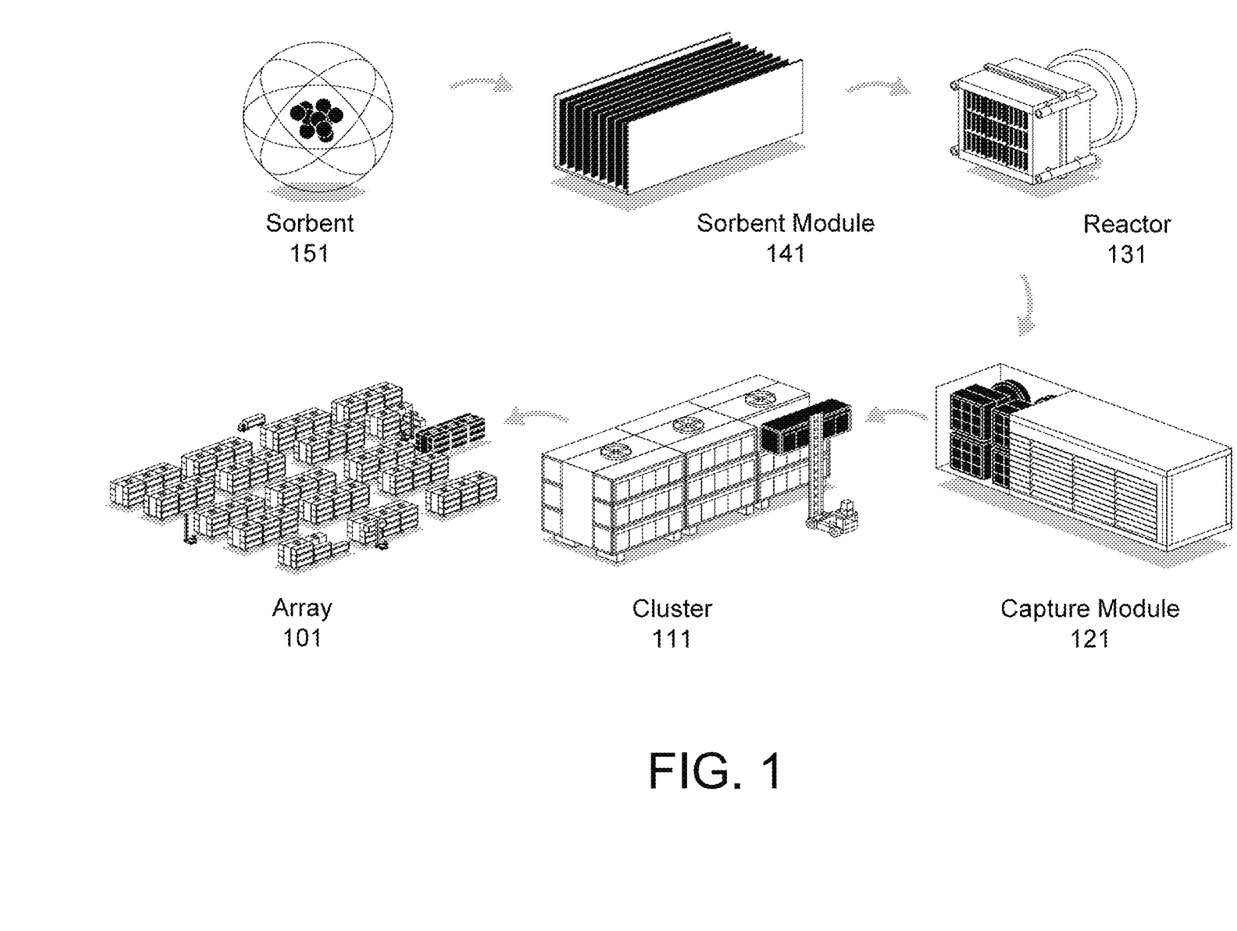
FIG. 1 shows an exemplary DAC array in accordance with the invention.

The systems of the present invention are assembled as arrays of modular DAC units. An exemplary MOSA DAC array 101 is shown in FIG. 1. The arrays 101 are formed of clusters 111 of DAC processing (capture) modules 121. The clusters 111 can be easily arranged in various fashions within the array 101 to accommodate local geographical features, to take advantage of existing infrastructure, or to optimize air flows within the array. The DAC capture modules 121 include multiple reactors 131 where $CO_2$ is removed from the air by a sorbent material. In some embodiments of the present invention, the sorbent materials 151 are packaged or configured as a modular sorbent structure 141. In some embodiments of the present invention, the sorbent materials 151 are supported within modular sorbent containers. One or more of the modular sorbent structures (sorbent modules 141) can be utilized in each reactor 131. Generally, multiple modular sorbent structures (sorbent modules 141) are utilized in each reactor. The modular sorbent structures (sorbent modules 141) include the sorbent 151 in a form that can be easily handled and utilized within the reactors 131. The modular sorbent structures (sorbent modules 141) are replaceable to facilitate maintenance, variation, and upgrading of the sorbent material. New, higher performing sorbents can be readily incorporated into the existing modular equipment and array infrastructure simply by replacing sorbent modules. In some embodiments of the present invention, the modular sorbent structures (sorbent modules 141) are of a size, shape, and weight so that they can be handled by individual employees or pairs of employees. In some embodiments of the present invention, each of the modular sorbent structures (sorbent modules 141) weighs less than or equal to fifty (50) pounds.

Figure 2:
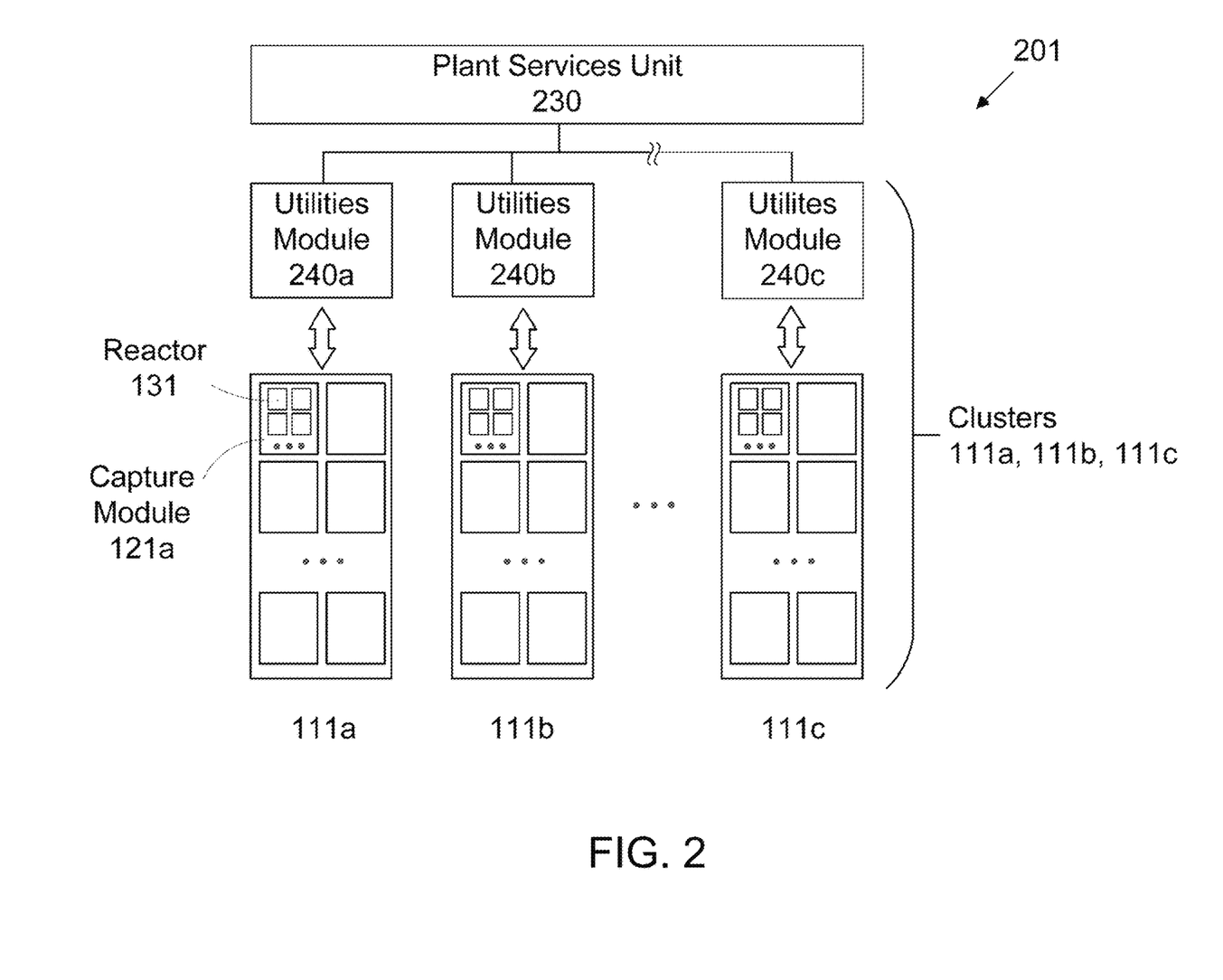
FIG. 2 shows exemplary modular components of an exemplary DAC array in accordance with the invention.
Figure 3:
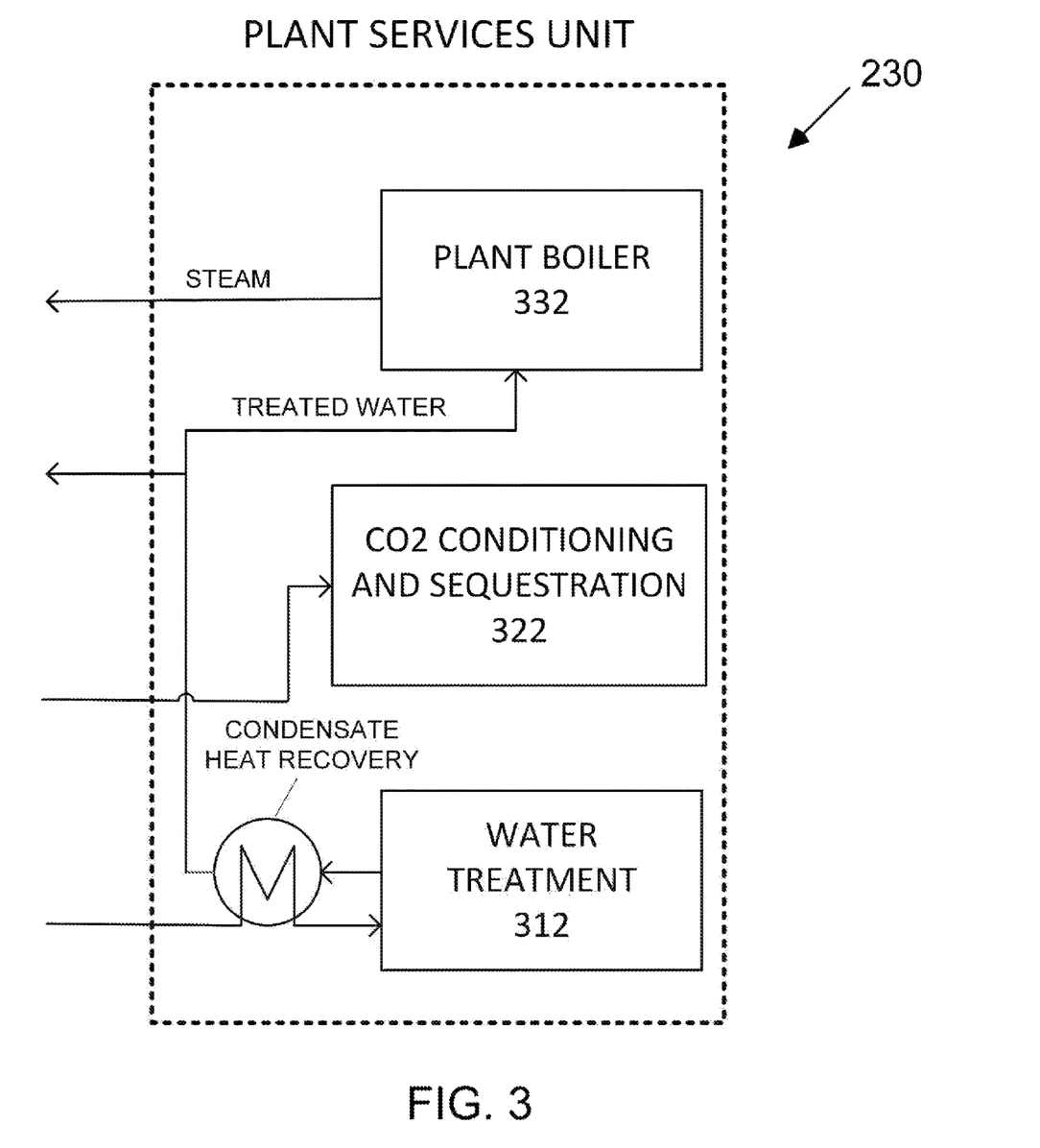
FIG. 3 shows an exemplary plant services unit providing steam, water treatment, and $CO_2$ processing services.

The major components of an exemplary MOSA DAC array 201 are interconnected as shown in FIG. 2. The DAC clusters 111a, 111b, 111c are generally sited near or around a plant services unit 230. An exemplary plant services unit 230 is depicted in FIG. 3. The plant services units 230 provide various critical support services, including power distribution, well- and/or waste-water treatment in water treatment unit 312, high-pressure steam generation in plant boiler 332, and central control functions. In some embodiments of the present invention, the plant services unit 230 can also include or can be connected to renewable power generation sources such as solar arrays, wind farms, and/or geothermal plants. In some embodiments, high voltage power is to be utilized for the boiler, with lower voltages used for other process equipment. In some embodiments, the plant services unit 230 can also provide $CO_2$ compression and storage, $CO_2$ upgrading or conversion processes, and/or $CO_2$ deep-well injection (all shown in $CO_2$ conditioning and sequestration unit 322). Nitrogen, oxygen, and/or water may need to be further separated from the product $CO_2$ stream to bring it to a purity that meets the requirements of a particular end-use. The plant services unit 230 can be dedicated to the system or can be shared with other operations. For example, the modular system can be located in an industrial park where centralized plant services are shared by various entities located therein or can be co-located near other industrial operations where relevant plant services can be shared "over the fence." Plant services units 230 are typically purpose-built facilities that benefit from larger scale, so there is little motivation to modularize these functions unless otherwise dictated by local site requirements.

In some embodiments of the present invention, multiple arrays can be arranged and coordinated in a higher level of organization denoted trains. As a nonlimiting example, some locations might include a localized collection of dispersed injection wells, where each well has a certain $CO_2$ capacity. A plant services unit can be established at each injection well with an appropriately sized array with an output capacity to match the input capacity of such injection well. As another nonlimiting example, certain plant services equipment, such as steam boilers as a nonlimiting example, may have functional size limitations that limit the size of an array. Additionally, there can be performance advantages to limiting overall piping lengths between plant services units, utilities modules, and capture modules. Under such circumstances, a train comprising multiple plant services units and associated arrays is more efficient than a single large array.

Figure 4:
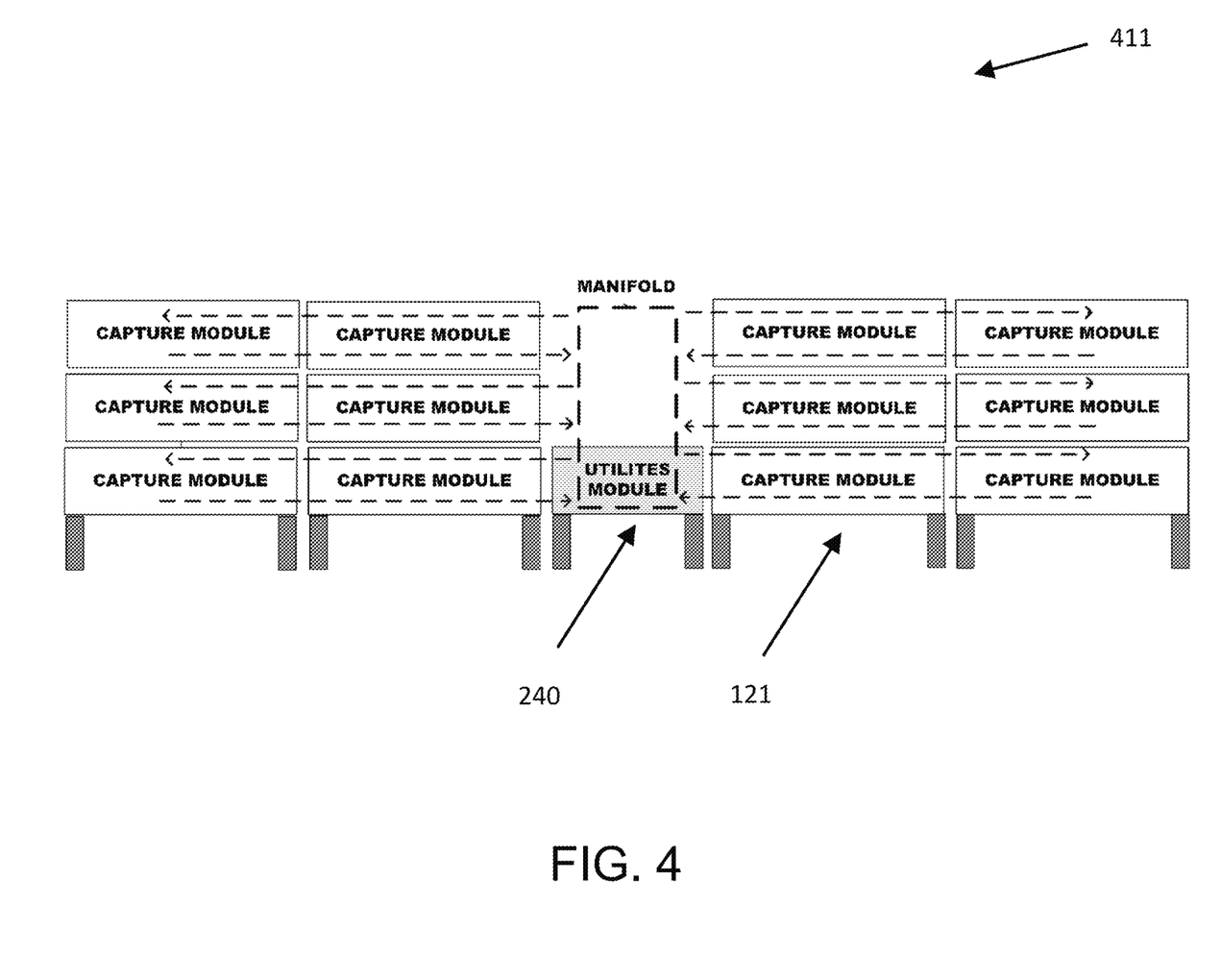
FIG. 4 shows an exemplary cluster with multiple capture modules located around and serviced by a utilities module.

As shown in FIGS. 2 and 4, the functional unit of operation for the DAC systems of the present invention is a cluster 111, 411. The DAC clusters 111a, 111b, 111c form arrays 101 distributed around the plant services unit 230 and comprise utilities modules 240a, 240b, 240c and capture modules 121a, 121b, 121c. The utilities module 240 serves as an interface between plant-level pipe flows and module-level pipe flows as depicted in FIG. 2. Plant-level piping and headers 255 connect the utilities modules 240 to the plant services unit 230. The utilities module 240 also houses major process equipment that serves multiple reactors and modules, such as vacuum pumps, condensers, heat exchangers, and heat recovery equipment (not shown separately). Each of the utilities modules 240a, 240b, 240c further customizes, distributes and/or augments services from the plant services module 230 to meet the needs of various capture modules 121a, 121b, 121c surrounding the utilities module 240a, 240b, 240c. For example, in some embodiments of the present invention, the utilities modules 240a, 240b, 240c accept high pressure steam from plant services 230 and lets it down to lower pressure for distribution to the capture modules 121a, 121b, 121c. The utilities module 240 also collects desorbed $CO_2$ from the capture modules 121a, 121*b*, 121*c*, condenses out retained moisture, and sends it back to plant services 230 for further processing or storage. The utilities module 240 may also provide, for example, a vacuum source for the capture modules 121*a*, 121*b*, 121*c* and equipment to condense and/or collect process water to return to plant services for treatment. In some embodiments of the present invention, the utilities module 240 also comprises heat exchangers, heat pumps, compressors and/or other heat recovery equipment and processes. The utilities modules 240*a*, 240*b* 240*c* also comprise instrumentation and controls for the components located within the utilities module 240 and that integrate with control functions located in the plant services unit and the capture modules 121*a*, 121*b*, 121*c*.

The utilities modules 240*a*, 240*b* 240*c* can be of varying sizes and capacities, depending on the number of capture modules 121 it is intended to support. In general, however, each utilities module 240 serves from about 8 to about 20 capture modules 121 such that the capture modules 121*a*, 121*b*, 121*c* can be placed in close proximity to their associated utilities module 240*a*, 240*b* 240*c* as shown in FIGS. 1, 2, and 4. In some embodiments of the present invention, each utilities module 240 serves from about 12 to about 18 capture modules 121. In some embodiments of the present invention, the utilities modules 240*a*, 240*b* 240*c* have an overall system size and design corresponding to that of a standard shipping container for the purposes of easing transportation, recognizing that there is some amount of leeway in the exact dimensions, weights, and shapes that can be effectively transported. In some embodiments of the present invention, the nominal container size is approximately 20 feet long and 8 feet wide. In some embodiments of the present invention, the nominal container size is approximately 40 feet long and 8 feet wide. In some embodiments of the present invention, the nominal container size is approximately 53 feet long and 8 feet wide. In some embodiments of the present invention, the utilities modules 240*a*, 240*b* 240*c* are prefabricated within two or more standard shipping containers that can be transported to and assembled at the desired site location. Furthermore, by retaining a modest size for the utilities modules 240*a*, 240*b* 240*c*, they may take advantage of readily available sizes of plant equipment and other manufacturing components. In some embodiments of the present invention, the utilities modules 240*a*, 240*b* 240*c* comprise larger structures that are locally fixed and can service an even higher number of capture modules 121*a*, 121*b*, 121*c* and/or serve to provide certain services that are not readily available from the local plant services unit. Furthermore, the modular utilities modules may be easily replaced or upgraded, if necessary, to accommodate newer generations of sorbents that are incorporated into the array and further facilitate continuous improvement of the system.

Figure 5:
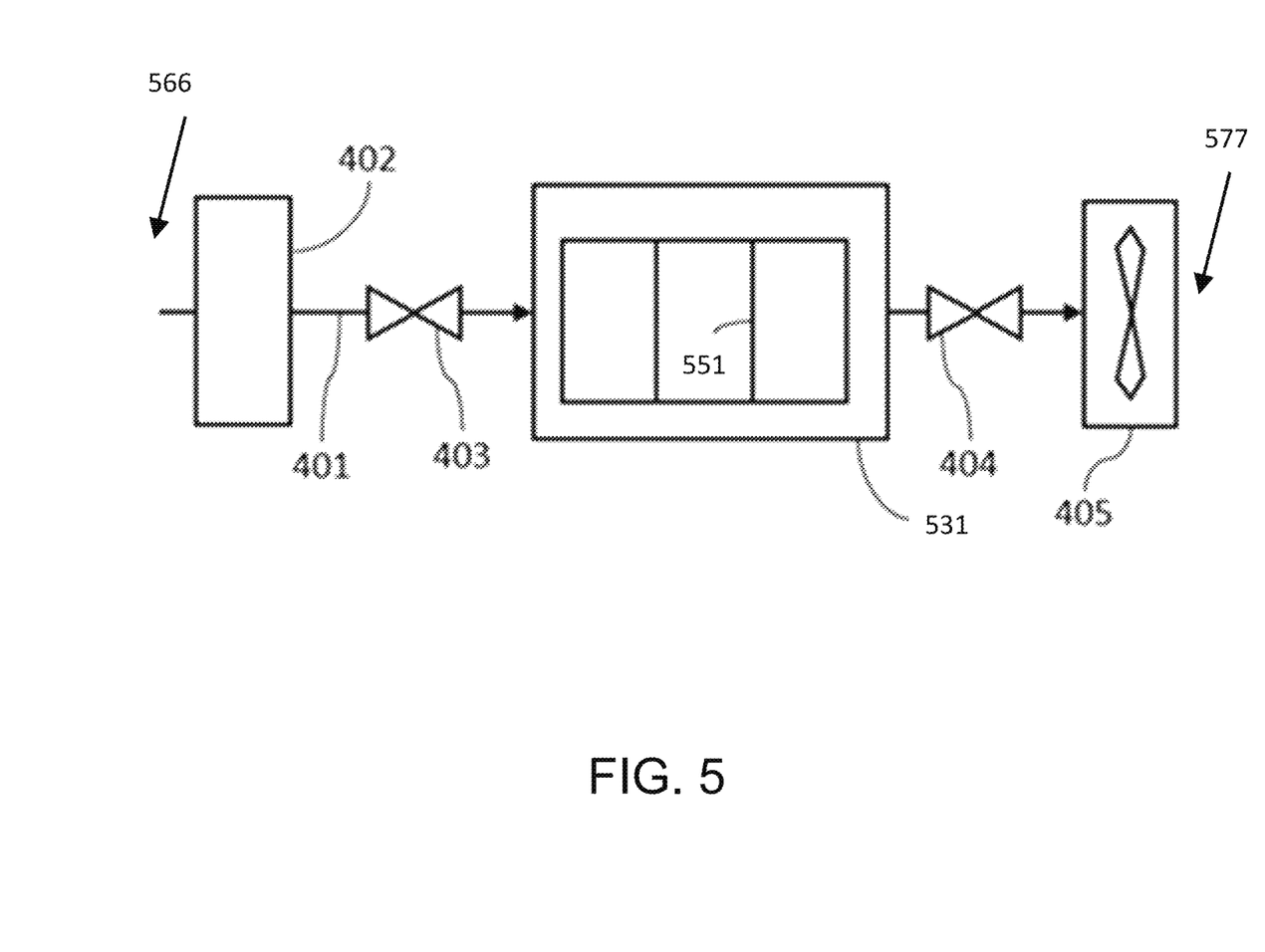
FIG. 5 shows an exemplary plant services unit and selected service connections entering and exiting the unit.
Figure 6:
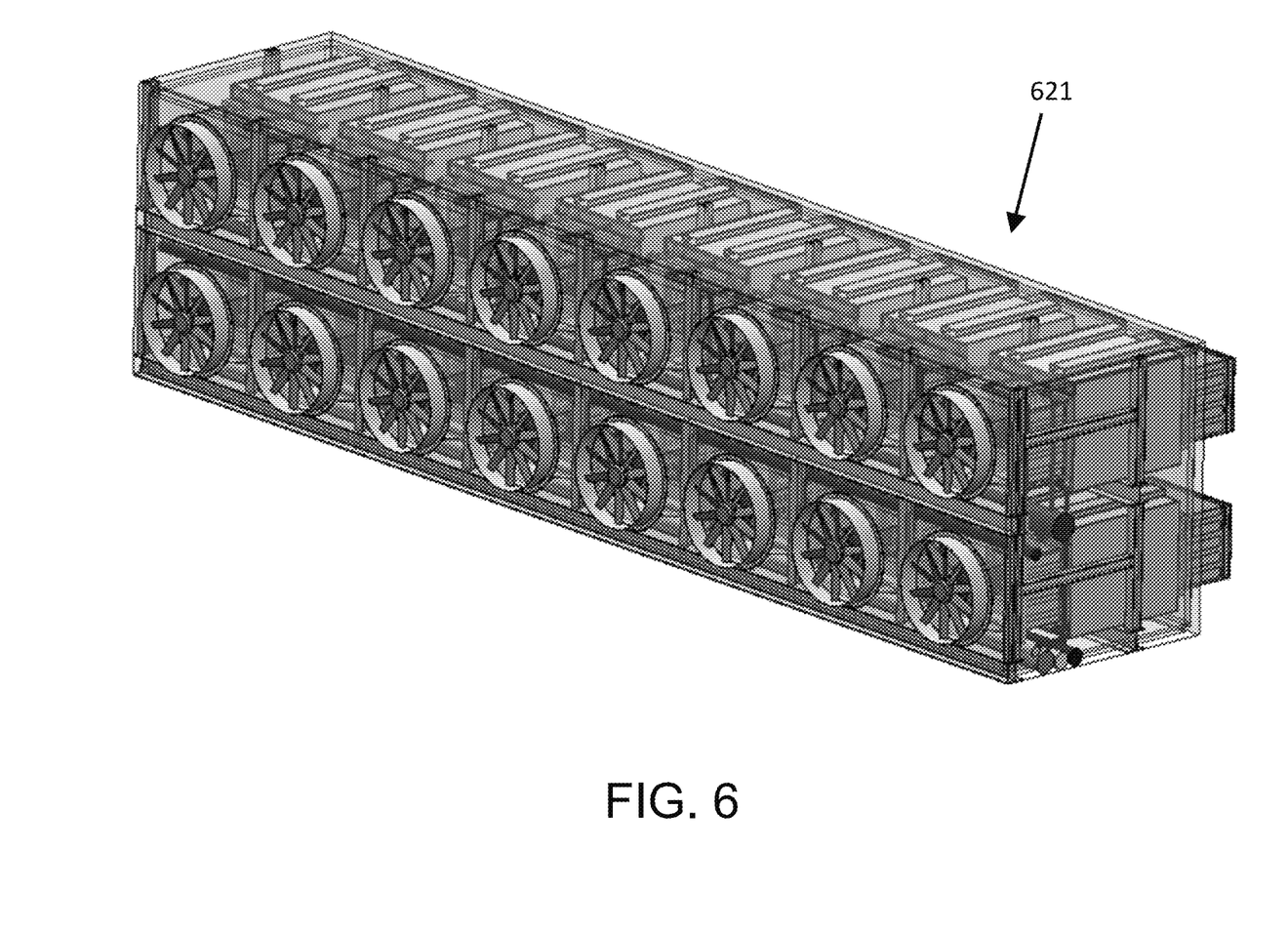
FIG. 6 shows an exemplary capture module comprising sixteen (16) individual sorbent reactors and fans.
Figure 7:
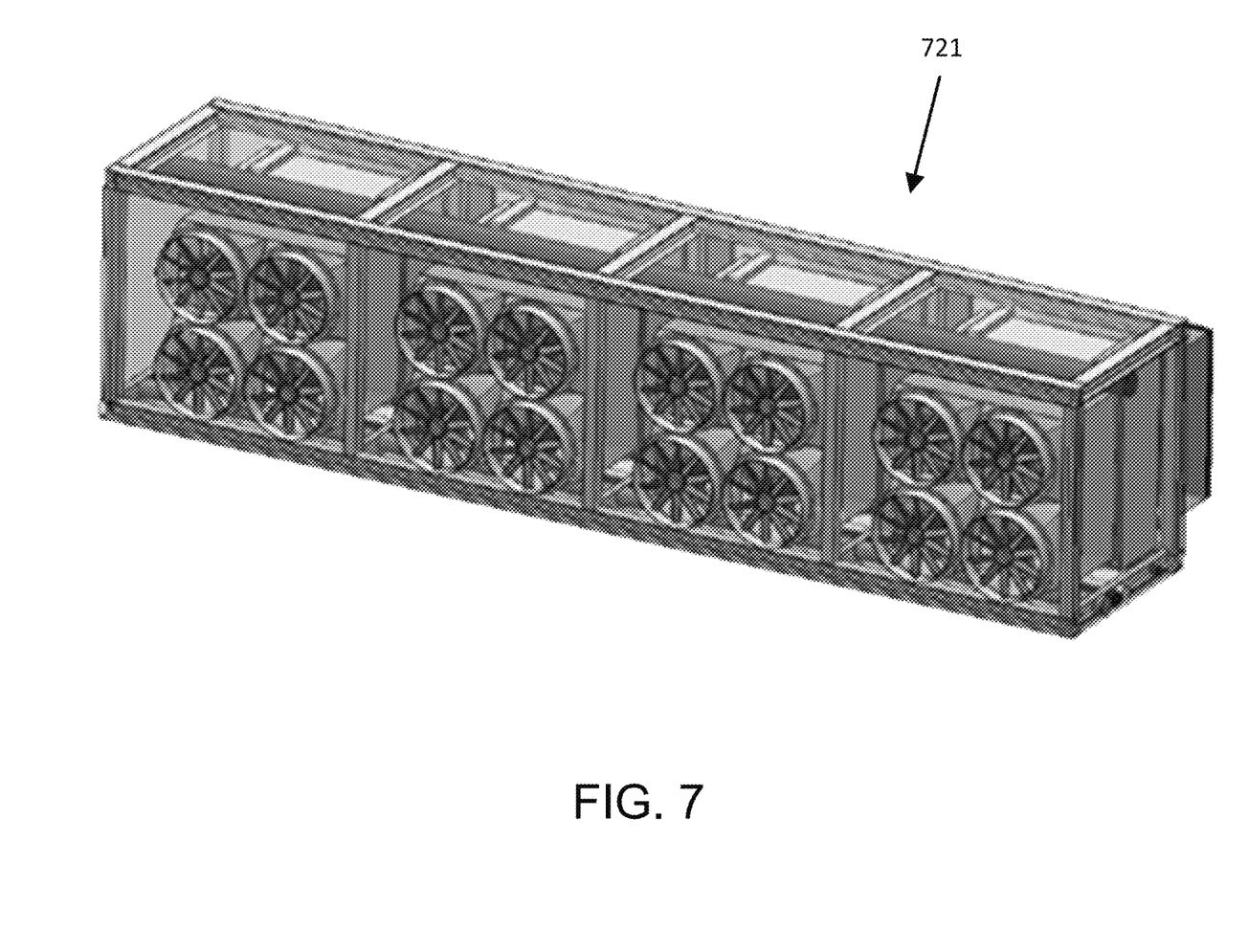
FIG. 7 shows an exemplary capture module comprising four (4) individual sorbent reactors, each supported by a set of four (4) fans.
Figure 8:
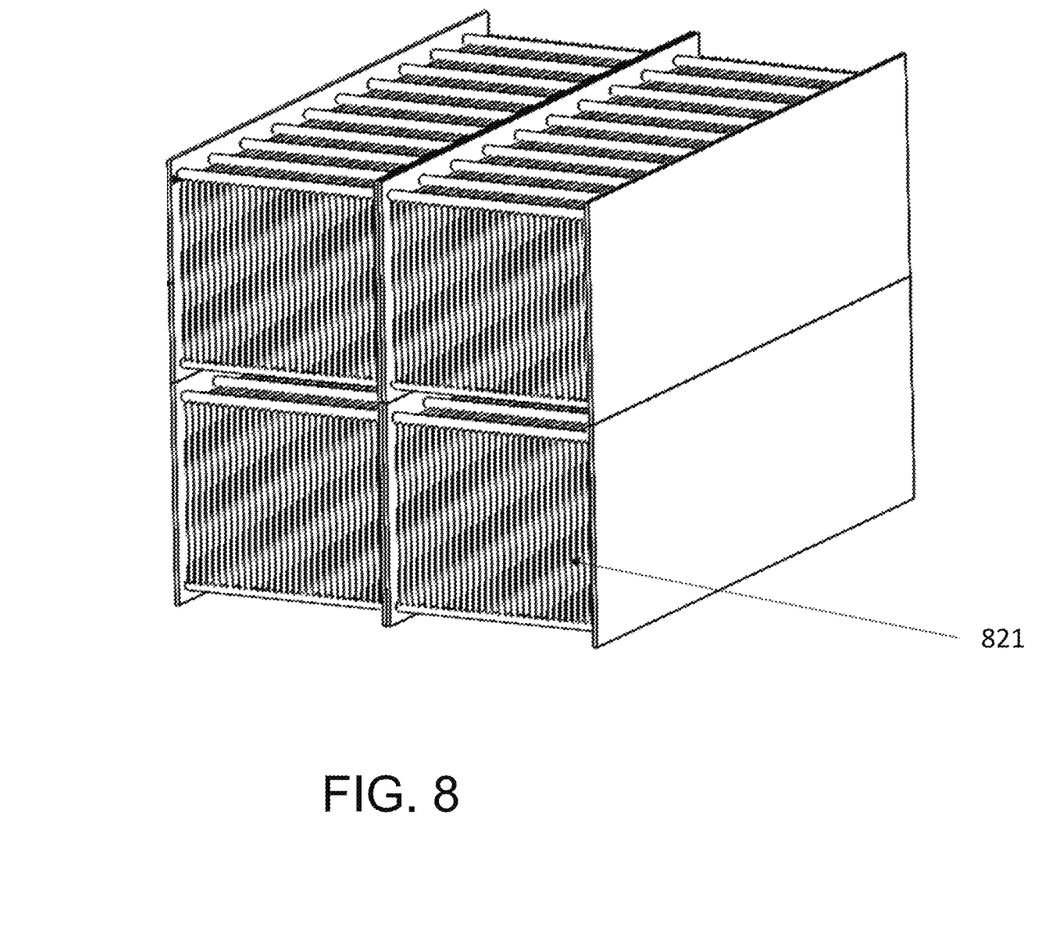
FIG. 8 shows an exemplary 2×2 modular sorbent structure array in accordance with the invention.

Each capture module 121 includes a number of individual sorbent reactors and a fan system to push or pull air through the sorbent reactors. The primary makeup of an exemplary sorbent reactor 531 is shown in FIG. 5, with a fan 405 located on the outlet side 577 that pulls ambient air through an air filter 402 on the inlet side 566 and through the reactor 531 during the adsorption step. During operation, atmospheric air including an ambient concentration of $CO_2$ is drawn into sorbent reactor 531 along a path 401, passing through the air filter 402, an air inlet valve 403, over sorbent 551, and through an air outlet valve 404 by way of the motive force of fan 405. In some embodiments of the invention, a fan or blower is located on the inlet side 566 of the sorbent reactor 551 and pushes ambient air through the air filter 402 and into and through the sorbent reactor 551. An exemplary capture module 621 comprising sixteen (16) sorbent reactors, each with its own fan, is shown in FIG. 6. An exemplary capture module 721 comprising four (4) sorbent reactors, each with a system of four (4) fans, is shown in FIG. 7. FIG. 8 shows an exemplary 2×2 modular sorbent structure array 821 in accordance with the invention. In some embodiments of the present invention, each capture module includes a centralized fan system that services the various reactors.

The capture modules include modular sorbent cartridge assemblies and perform the adsorption-desorption process. As outlined above, module-level piping and headers connect the capture modules to the utilities modules. The capture modules also comprise instrumentation and controls for the reactors and components located within the capture module and that integrate with control functions located in the plant services unit and the utilities modules. The capture modules have an overall system size and design corresponding to that of a standard shipping container for the purposes of easing transportation, recognizing that there is some amount of leeway in the exact dimensions, weights, and shapes that can be effectively transported. In some embodiments of the present invention, the nominal container size is approximately 20 feet long and 8 feet wide. In some embodiments of the present invention, the nominal container size is approximately 40 feet long and 8 feet wide. In some embodiments of the present invention, the nominal container size is approximately 45 feet long and 8 feet wide. In some embodiments of the present invention, the nominal container size is approximately 53 feet long and 8 feet wide. When the units are sufficiently small, e.g., the size of a shipping container, they can be readily and inexpensively mass produced at a centralized manufacturing facility and then easily transported to desired use locations. The modest size of the capture modules also generally allows common and readily available components to be utilized in their construction. The rectangular form factor and size of the capture modules allows for stacking of multiple units to minimize their areal footprint within the arrays using standard trailers and lifts designed to handle containers.

In some example embodiments of the invention, inside each of the capture modules are two or more reactors where (i) a sorbent material adsorbs $CO_2$ from the air; and (ii) the sorbent material is regenerated and desorbs and releases the captured $CO_2$. In some embodiments of the present invention, the capture module comprises four or more reactors. In some embodiments of the present invention, the capture module comprises between 4-16 reactors. In some embodiments of the present invention, the capture module comprises between 8-16 reactors. In some embodiments of the present invention, adsorption and desorption are performed in separate reactors within the capture module. In such systems, the sorbent material is generally structured into a form that can be transported between the adsorption and desorption reactors within the capture modules. In some embodiments of the present invention, adsorption and desorption are performed within a single type of reactor capable of operating under both adsorption and desorption process conditions. In such systems, the sorbent material is generally fixed within the reactor and valving and other process controls are utilized to alter the process conditions with the reactor between adsorption and desorption modes.

The sorbent materials utilized within the capture modules are packaged in a modular cartridge format that can be easily handled, transported, replaced, upgraded, etc. The cartridges consist of individual units which act as support structures for the sorbent, and the individual units can be assembled into a larger bed of arbitrary dimensions within the reactors. The cartridges can be designed and sized to optimally support a wide variety of structured sorbents with differing properties such as thickness, strength, stiffness, thermal expansion, etc. A key element of the present invention is its modularity, which as described above allows the bed to be scaled up and down in size by simply stacking repeating units in any combination of directions. One version of such a modular bed includes individual structures that house sorbent, and these structures can be joined or stacked to achieve the desired size and amount of sorbent in the bed. As shown in FIGS. 7 and 8, the sorbent cartridges can be stacked in an array to create a larger sorbent structure. The array can be of any size, including but not limited to 2×2, 3×3, 4×4, 2×3, 3×2, 2×4, 3×5, 5×3, 5×5, etc. as desired for a particular application. In other embodiments, the sorbent support trays can be utilized in a three-dimensional (3D) array format, including but not limited to 3×3×2, 3×3×3, 3×5×3, 5×5×3, etc. In some embodiments of the present invention, a single large cartridge can be utilized within some or all of the reactors.

The modular nature of the sorbent structures also facilitates incorporation of various types of sensors within the sorbent bed. In the case of temperature sensors applied to a sorbent bed for capture of carbon dioxide, evenly distributing them through the bed allows for understanding of evenness and rate of both adsorption of $CO_2$ and heating and cooling of the bed as part of temperature swings for desorption and regeneration. In some applications, the temperature measurements may also give information relating to the progress of steam heating, evaporative cooling, water cooling, or any number of fluid flow processes that may affect the temperature of the bed. These sensors need not be temperature sensors but can be sensors for any range of measurement, and need not be probes but can be surface sensors, wire leads, etc.

In some embodiments of the present invention, the sorbent material is a structured sorbent material which allows a high flow of air through the sorbent modules with a low pressure drop. In some embodiments of the present invention, the structured sorbent material is in the form of a monolith material with the sorbent coated onto, incorporated into, or forming the walls of the supporting monolith material. In some embodiments of the present invention, the structured sorbent material is in the form of a honeycomb material with the sorbent coated onto, incorporated into, or forming the walls of the supporting honeycomb material. In some embodiments of the present invention, the structured sorbent material is in the form of parallel sheets or plates supported within a support structure such as a parallel plate contactor structure. The parallel sheets can comprise sorbents coated onto, impregnated into, or embedded in porous polymeric supports; woven glass, carbon, ceramic, or polymeric fiber fabrics; or glass, carbon, ceramic, or polymeric fiber felts. In some embodiments of the present invention, the structured sorbent material can be in the form of an open-cell foam or other type of reticulated sheet or structure through which air can flow. In some embodiments of the present invention, the sorbent material can be in the form of a powder, bead, or other particulate form included within a tubular, disc, sheet, or pleated sheet shaped structure through which air can be passed.

In some embodiments of the present invention, the sorbent reactors operate via a temperature swing adsorption (TSA) process. The TSA process generally involves three steps: (i) adsorption; (ii) desorption via heated purge; and (iii) cooling. During adsorption, ambient air is pulled or pushed through the sorbent using a fan or blower, and $CO_2$ is adsorbed. Adsorption variables include air flow rate, sorbent capture efficiency, sorbent capacity, and adsorption time. During desorption, air flow is stopped, and a heated purge gas is passed through the sorbent to effect desorption and to sweep desorbed $CO_2$ out of the reactor. In some embodiments of the present invention, the purge gas is an inert gas such as nitrogen to prevent oxidation of the sorbent during heating. In some embodiments of the present invention, the purge gas is a product gas (i.e., $CO_2$) so as not to dilute the purity of the desorbed product. In some embodiments of the present invention, thermal jackets or surface heaters can be utilized to help heat the sorbent modules during the purge step. Desorption variables include purge gas, purge gas flow rate, temperature, and desorption time. After desorption, the reactor is purged with a cool stream of air or inert gas, depending upon the oxygen sensitivity of the sorbent, to cool the system back to ambient. For a given sorbent and reactor system, the adsorption time, air flow rate, purge gas temperature and flow rate, desorption time, and cooling time are typical process parameters that can be monitored and controlled.

In some embodiments of the present invention, the sorbent reactors operate via a temperature vacuum swing adsorption (TVSA) process. The TVSA process generally involves four steps: (i) adsorption; (ii) evacuation; (iii) desorption; and (iv) cooling. During adsorption, ambient air is pulled or pushed through the sorbent using a fan or blower, and $CO_2$ is adsorbed. Adsorption variables include air flow rate, sorbent capture efficiency, sorbent capacity, and adsorption time. During evacuation, the reactor is sealed, and air is evacuated using a vacuum pump to remove dead air and non-condensable gas impurities. The sorbent in the reactor is then heated, which desorbs $CO_2$, which is removed through the vacuum system. In some embodiments of the present invention, thermal jackets or surface heaters can be utilized to heat the sorbent modules during the evacuation step. Desorption variables include evacuation level, temperature, and desorption time. After desorption, the reactor is purged with a cool stream of air or inert gas, depending upon the oxygen sensitivity of the sorbent, to cool the system back to ambient. For a given sorbent and reactor system, the adsorption time, air flow rate, evacuation level, desorption temperature and time, and cooling time are typical process parameters that can be monitored and controlled.

In some embodiments of the present invention, the sorbent reactors operate via a steam-assisted temperature vacuum swing adsorption (S-TVSA) process. The S-TVSA process generally involves four steps: (i) adsorption; (ii) evacuation; (iii) steam-assisted desorption; and (iv) evaporative cooling. During adsorption, ambient air is pulled or pushed through the sorbent using a fan or blower, and $CO_2$ is adsorbed. Adsorption variables include air flow rate, sorbent capture efficiency, sorbent capacity, and adsorption time. During evacuation, the reactor is sealed, and air is evacuated using a vacuum pump to remove dead air and non-condensable gas impurities. Desorption occurs in two steps: re-pressurization and purge. Steam is introduced into the reactor to raise the pressure to the desired desorption pressure, heating the sorbent in the process. The reactor outlet is then opened to begin purge, which desorbs $CO_2$ and sweeps it into a wet $CO_2$ product stream. Steam is an effective carrier to sweep away gaseous $CO_2$ as it is being desorbed, thereby promoting increased desorption by way of reducing the partial pressure of the gas above the sorbent.

Desorption variables include evacuation level, steam temperature/pressure, and purge time. After desorption, the reactor is evacuated again using a vacuum pump to desorb water from the sorbent and rapidly cool it. The evaporation of this water removes heat from the sorbent, mitigating the risk of sorbent oxygenation when air is readmitted for the next adsorption cycle. For a given sorbent and reactor system, the adsorption time, air flow rate, evacuation level, steam temperature/pressure, steam purge rate and time, and evaporative cooling time are typical process parameters that are monitored and controlled.

Figure 9:
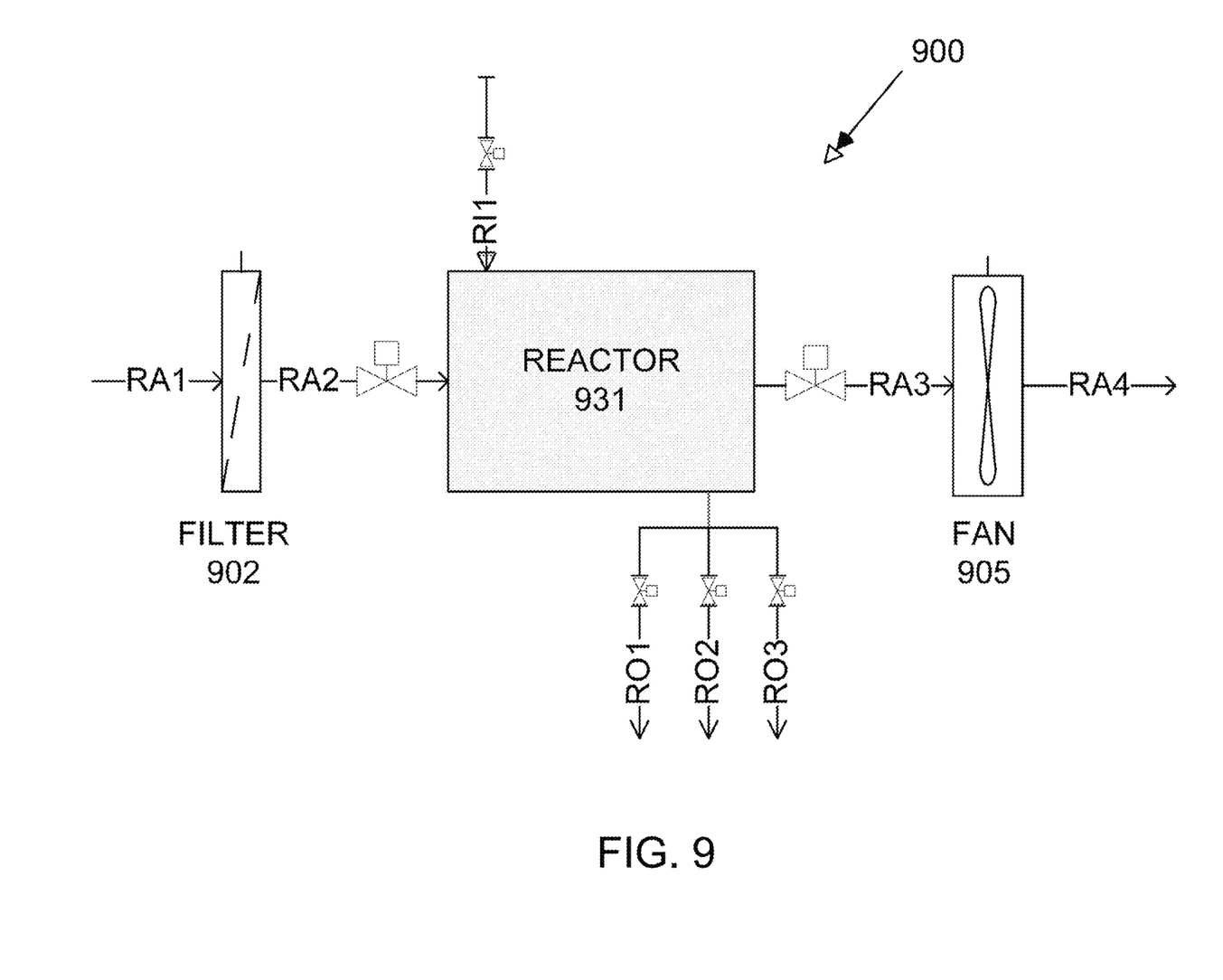
FIG. 9 shows an exemplary layout for an S-TVSA reactor in accordance with the invention.

FIG. 9 shows an exemplary reactor configuration 900 suitable for DAC processing conditions utilizing S-TVSA. Along with the previously described fan(s) 905, filter 902, and associated valving, the reactor 931 is also fitted with an inlet for steam (RI1) from the utilities module and outlets to allow evacuation of dead air (RO1), transfer of the steam purge with desorbed $CO_2$ product (RO2) back to the utilities module for separation, and to vacuum (RO3) to remove final amounts of $CO_2$ and to effect evaporative cooling. Downstream of the reactor in the utilities module, the $CO_2$-containing vapor streams are condensed to recover the water and to separate out remaining $CO_2$ in the stream. In some embodiments of the invention, the utilities modules comprise heat pumps, vapor re-compressors, jet ejectors, and/or other similar equipment to recover heat energy from the various process streams. In some embodiments of the invention, the utilities modules collect and return condensed water and gaseous $CO_2$ streams back to the plant services unit for treatment and collection.

The various reactors and modules within the array are controlled and coordinated by process control systems that stagger the adsorption/desorption cycles to achieve the most efficient processes and to provide near steady-state operation of the array and continuous production of $CO_2$. The process flows into and out of the various reactors and modules are controlled using valves on inlet and outlet manifolds for each unit. For example, managing the number of reactors undergoing simultaneous adsorption/desorption can reduce the needed size of steam pipes and valves and balance power loads.

As those skilled in the art will appreciate, numerous modifications and variations of the present invention are possible in light of these teachings, and all such are contemplated hereby. All of the references cited herein are incorporated by reference herein for all purposes, or at least for their teachings in the context presented.

What is claimed is:

1. A modular open architecture Direct Air Capture (DAC) system with multiple levels of modularity for removing carbon dioxide ($CO_2$) from the atmosphere, the system comprising:
   a) a plant services unit 230 for providing at least one of the group of power distribution, water treatment, steam, and control signals;
   b) two or more utilities modules 240 connected to the plant services unit 230 and receiving the at least one of power distribution, water treatment, steam, and control signals; and
   c) two or more DAC capture modules 121 connected to respective utilities modules 240, wherein each DAC capture module 121 comprises two or more sorbent reactors 131, and each sorbent reactor 131 comprises two or more removeable sorbent modules 141.

2. The modular open architecture Direct Air Capture (DAC) system of claim 1, wherein the removable sorbent modules 141 comprise:
   a) one or more structured sorbents, each comprising a sorbent material capable of selectively adsorbing $CO_2$ from the atmosphere and fabricated into a structured form;
   b) one or more support structures containing and constraining one or more of the structured sorbents such that an air stream may readily flow through a cartridge in at least one direction.

3. The modular open architecture Direct Air Capture (DAC) system of claim 1, wherein the plant services unit 230 further comprises:
   a renewable power generation source.

4. The modular open architecture Direct Air Capture (DAC) system of claim 1, wherein the plant services unit 230 further provides $CO_2$ conditioning and sequestration.

5. The modular open architecture Direct Air Capture (DAC) system of claim 1, wherein the utilities module 240 further comprises at least one of the group of vacuum pumps, condensers, heat exchangers, and heat recovery equipment for serving two or more DAC capture modules 121.

6. The modular open architecture Direct Air Capture (DAC) system of claim 5, wherein the utilities module 240 serves from about 8 to 20 DAC capture modules 121.

7. The modular open architecture Direct Air Capture (DAC) system of claim 1, wherein the utilities modules 240 and the DAC capture modules 121 are each independently configured in size and design corresponding to a standard shipping container for transportation.

8. The modular open architecture Direct Air Capture (DAC) system of claim 7, wherein the standard shipping container is selected from the group consisting of shipping containers approximately 20 feet long and 8 feet wide, approximately 40 feet long and 8 feet wide, and approximately 53 feet long and 8 feet wide.

9. The modular open architecture Direct Air Capture (DAC) system of claim 1, wherein the two or more DAC capture modules 121 each comprise between 4-16 sorbent reactors 131, inclusively.

10. The modular open architecture Direct Air Capture (DAC) system of claim 2, wherein the removeable sorbent modules 141 comprise different sorbents that are interchangeable.

11. A method to remove carbon dioxide ($CO_2$) from the atmosphere using a modular open architecture Direct Air Capture (DAC) system, the method comprising:
   a) adsorbing $CO_2$ from ambient air by pulling or pushing a flow of ambient air through a sorbent 151 with one or more fans, wherein the sorbent 151 is housed within one or more sorbent modules 141, and wherein the one or more sorbent modules 141 are modular sorbent support structures is housed within a sorbent reactor 131, and wherein two or more sorbent reactors 131 are housed within a capture module 121; and two or more capture modules 121 are connected to a utilities module 240 to form a cluster 111;
   b) stopping the flow of ambient air through the sorbent 151 by sealing the sorbent reactor 131 to the flow of ambient air;
   c) applying a vacuum to the sealed sorbent reactor 131 to remove residual ambient air;
   d) repressurizing the sorbent reactor 131 by opening a steam inlet on the sorbent reactor 131 to a flow of steam from the utilities module 240;
   e) desorbing $CO_2$ from the sorbent 151 by opening a steam outlet on the sorbent reactor 131 to allow the flow of steam to flow through and heat the sorbent 151 and cause $CO_2$ to be desorbed and carried with the flow of steam through the steam outlet back to the utilities module 240;
f) passing the flow of steam containing desorbed $CO_2$ through a condenser in the utilities module 240 to condense liquid water and pass gaseous $CO_2$ to a plant services unit 230 to be collected;
g) cooling the sorbent 151 by evaporative cooling by stopping the flow of steam through the sorbent reactor 131 by closing the steam inlet and steam outlet and applying a vacuum to the sorbent reactor 131 to evaporate residual moisture and remove residual $CO_2$ to create a moist $CO_2$ stream;
h) passing the moist $CO_2$ steam through a condenser in the utilities module 240 to condense liquid water and pass gaseous $CO_2$ to the plant services unit 230 to be collected; and
i) restarting the adsorption step a).

12. The method of claim 11, wherein two or more clusters 111 form an array 101 of modular Direct Air Capture (DAC) units collectively serviced by the plant services unit 230.

13. The method of claim 12, wherein a subset of the two or more sorbent reactors 131 within the array 111 are undergoing adsorption step a) while a different subset of the two or more sorbent reactors 131 within the array 111 are undergoing desorption step e).

14. The method of claim 12, wherein the sorbent 151 is a structured sorbent material for allowing a high flow of air through the sorbent modules 141 with a low pressure drop.

15. The method of claim 14, wherein the structured sorbent material includes two or more sheets or plates supported within the sorbent modules 141 in parallel.

16. The method of claim 15, wherein the parallel sheets or plates include sorbents coated onto, impregnated in, or held within porous polymeric supports, woven glass, carbon, ceramic or polymeric fiber fabrics or membranes, or glass, carbon, ceramic, or polymeric fiber felts.

17. The method of claim 14, wherein the structured sorbent material is in the form of a monolith material with the sorbent coated onto, incorporated into, or forming the walls of the monolith material.

18. The method of claim 14, wherein the structured sorbent material is in the form of at least one of the group of a honeycomb material with the sorbent coated onto, incorporated into, or forming the walls of the supporting honeycomb material, in the form of an open-cell foam, or in the form of a reticulated sheet or structure through which air may flow.

19. The method of claim 12, wherein the sorbent 151 is a powder, bead, or other particulate form included within a tubular, disc, sheet, or pleated sheet shaped structure through which air may pass.

20. The method of claim 12, wherein two or more arrays 101 are arranged and coordinated to collectively remove carbon dioxide ($CO_2$) from the atmosphere in a train configuration.

* * * * *